(No Model.)
G. E. ADAMS.
FASTENER FOR GLOVES.
No. 566,731. Patented Sept. 1, 1896.
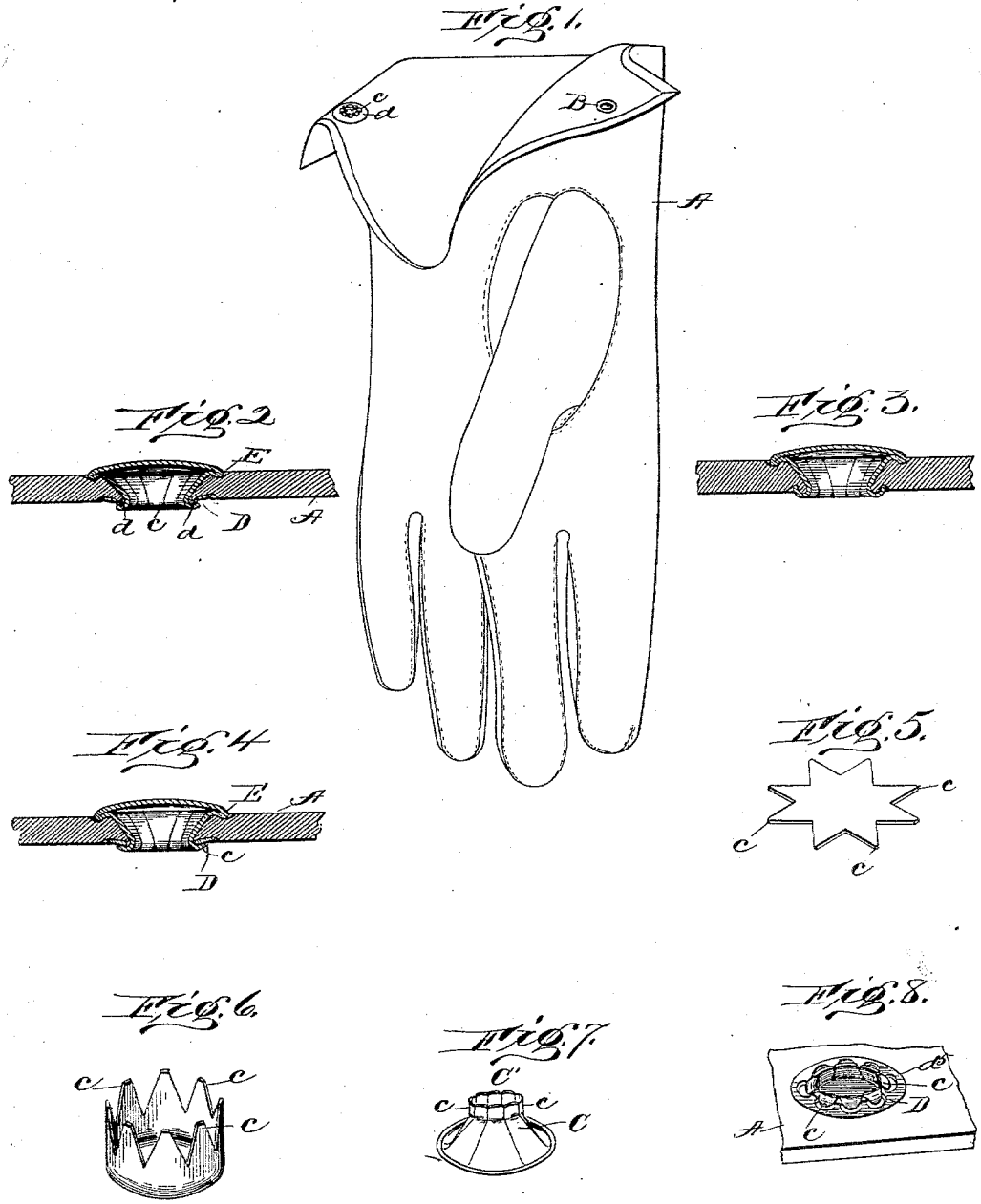
Witnesses:
J. M. Fowler Jr
Alex F. Stewart
Inventor
George E. Adams,
by Church & Church
his Attorneys

UNITED STATES PATENT OFFICE.

GEORGE E. ADAMS, OF NEW BRITAIN, CONNECTICUT.

FASTENER FOR GLOVES.

SPECIFICATION forming part of Letters Patent No. 566,731, dated September 1, 1896.

Application filed April 11, 1896. Serial No. 587,136. (No model.)

*To all whom it may concern:*

Be it known that I, GEORGE E. ADAMS, of New Britain, in the county of Hartford, State of Connecticut, have invented certain new and useful Improvements in Fasteners for Gloves and other Articles; and I do hereby declare the following to be a full, clear, and exact description of the same, reference being had to the accompanying drawings, forming a part of this specification, and the letters of reference marked thereon.

This invention relates to improvements in that class of fasteners for gloves and other articles in which the fastening device consists of two principal portions or members, namely, a socket portion and a stud portion, and more specifically it relates to that species of said class in which the stud is made rigid and the walls of the socket member or walls of the opening into the socket member are made resilient or yielding to facilitate the joining or separation of the parts and at the same time of sufficient strength to hold the parts in engagement and prevent their disengagement except when it is desired.

My present invention is designed as an improvement on the fastener described and claimed in my contemporaneous application, Serial No. 576,833, filed January 23, 1896, and has for its object to simplify the structure therein shown, and produce a more serviceable article at less cost.

Referring to the accompanying drawings, Figure 1 is a perspective view of the rear side of a socket and a stud member applied to a glove or piece of goods and showing the preferred manner of securing the socket member in place. Fig. 2 is a transverse section through the socket member on an enlarged scale. Fig. 3 is a similar view through a socket member secured in place without a washer. Fig. 4 is a similar view showing the employment of a flat or substantially flat washer. Figs. 5, 6, and 7 are perspective views illustrating the various steps in the formation of the socket member prior to its application to the glove or fabric. Fig. 8 is a perspective view showing another form of washer.

Like letters of reference in the several figures indicate the same parts.

The glove illustrated for convenience in showing the application of my present invention is indicated by the letter A and the stud member by the letter B, and it will be understood in referring to these parts that the glove may be any article the parts of which it is desired to secure together, and the stud may be of any ordinary well-known forms of studs having a substantially rigid head or projection adapted to coöperate with the socket member. The socket member in the present instance is formed with a series of resilient fingers or arms projecting from a cap-piece and adapted to be thrust through the article to be fastened and the ends of the arms turned back away from each other to secure the socket in place, the aperture within the circle of said arms constituting the restricted passage with resilient side walls through which the headed member or stud is adapted to pass. In my former invention the socket member was composed of two parts, namely, a body portion and a cap or cover for the same made separate and united by flanging the cap member around the edge of the body portion, but in my present invention I propose to form said socket member of a solid integral piece, first striking the same up from a flat sheet of metal, as shown in Fig. 5, with a series of points $c$, corresponding to the number of resilient arms in the completed socket member. This flat sheet-metal piece is first drawn up into the shape shown in Fig. 6, with the points or arms projecting directly up and with the cap portion properly curved to constitute the cap or outside of the device. From the shape shown in Fig. 5 the arms and upwardly-projecting portions are bent in any suitable dies to the shape shown in Fig. 7, with the edges of the arms in contact, their base portions being inclined inward to form a conical projection (indicated by the letter C) and their extreme ends extended upward in substantially parallel lines to form a cylindrical structure, as indicated at C', Fig. 7. In this shape the device is adapted to be passed through an opening in the article or goods to which the socket member is applied, and in order to secure it in place the extreme ends of the resilient arms are turned outward to secure the member in place, as before described. While these resilient arms may have their arms seated in the material to which the socket member is flanged, as illustrated in Fig. 2 and in my prior application before referred to, I prefer to interpose between said resilient arms and the material a conical washer D, Figs. 1 and 2, the washer having circular bead $d$, around which the ends of resilient arms may be bent to afford a good bearing and at the same time allow of sufficient movement of said arms to permit of the ready passage of the stud member when a slight amount of force is applied thereto. The washer will operate as a stay to prevent the straining of the arms to such an extent as might destroy their resiliency, and at the same time the lower edge of said washer coöperates with the edge of the cap (which it will be observed from Figs. 2 and 3 is bent down to form a downwardly-projecting annular flange E) to firmly clamp the goods and prevent the release of the socket member or the escape of the goods around the edges of the opening through which the socket member is thrust.

The most preferred form of washer, in addition to a central bead, has a series of apertures $d^5$, Fig. 8, corresponding to the resilient arms, and the ends of said arms are turned down through these openings and may seat in the goods. Thus if a fine fabric be employed there is no danger of cutting the same while the upper surface of the washer is left smooth.

Although I prefer to employ a substantially conical or beaded washer, it is obvious that a substantially flat washer may be employed, as illustrated in Fig. 4. It will be observed with this socket-member that a series of relatively long resilient arms are provided, each of which tapers from a wide base to a point, thus not only affording a very long member which will yield throughout its length, but a member which is best calculated to withstand the strains imposed upon it by the passage of the head of the stud member and the lateral strains due to the pull on the two parts of the article to which the fastening device is applied.

By making the body of the socket member, including the cap and resilient arms, in a single integral piece the device is rendered much stronger than where made in separate pieces, as heretofore, and what is of greater importance the cost of production is greatly reduced and the ease of application enhanced.

Having thus described my invention, what I claim as new is—

1. A fastening device struck up from an integral piece of sheet metal having a series of resilient tapering arms of substantially equal length with their ends bent outward to secure the device in place and form an annular resilient holding edge, the wider portions of said arms having their edges abutted and bent to form a conical cavity and their bases united by a curved cap portion having an annular shoulder coöperating with the material to hold the fastener in place; substantially as described.

2. As an improved article of manufacture the herein-described socket-blank struck up from an integral piece of sheet metal and having a series of tapering resilient arms of substantially equal length with their ends formed into a substantially cylindrical projection adapted to be passed through the fabric or article to which the socket member is applied, the wider portions of said arms having their edges abutted and bent to form a conical projection at the base of the cylindrical projection and their bases united to and connected together by a curved cap portion having an annular peripheral shoulder or bead; substantially as described.

3. In a glove-fastener, a socket member consisting of a cap portion with a series of resilient arms forming the socket proper, and a washer over which the ends of said arms are bent having a central opening and a surrounding series of apertures into which the ends of the arms are bent; substantially as described.

GEORGE E. ADAMS.

Witnesses:
JOHN P. BARTLETT,
ANNA G. ROCKWELL.